(12) United States Patent
Sakano

(10) Patent No.: US 12,442,418 B2
(45) Date of Patent: Oct. 14, 2025

(54) SEALING DEVICE AND SEALING STRUCTURE

(71) Applicant: NOK CORPORATION, Tokyo (JP)

(72) Inventor: Yuya Sakano, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/717,169

(22) PCT Filed: Feb. 24, 2023

(86) PCT No.: PCT/JP2023/006759
§ 371 (c)(1),
(2) Date: Jun. 6, 2024

(87) PCT Pub. No.: WO2023/167103
PCT Pub. Date: Sep. 7, 2023

(65) Prior Publication Data
US 2025/0043826 A1 Feb. 6, 2025

(30) Foreign Application Priority Data

Mar. 4, 2022 (JP) ................................ 2022-033412

(51) Int. Cl.
*F16C 33/78* (2006.01)
*F16J 15/3232* (2016.01)

(52) U.S. Cl.
CPC ...... *F16C 33/7823* (2013.01); *F16C 33/7883* (2013.01); *F16J 15/3232* (2013.01)

(58) Field of Classification Search
CPC .............. F16C 33/7823; F16C 33/7883; F16C 33/7879; F16J 15/3232; F16J 15/3256; F16J 15/3264
See application file for complete search history.

(56) References Cited

U.S. PATENT DOCUMENTS

| 10,293,531 | B2 * | 5/2019 | Kato | .................... B29C 45/1418 |
| 10,612,597 | B2 * | 4/2020 | Kato | .................... F16J 15/3264 |
| 10,663,003 | B2 * | 5/2020 | Kato | .................... F16C 19/186 |
| 11,994,166 | B2 * | 5/2024 | Sakano | ............... F16C 33/7876 |

(Continued)

FOREIGN PATENT DOCUMENTS

| JP | 2012-61875 | 3/2012 |
| JP | 2015-209957 | 11/2015 |

(Continued)

OTHER PUBLICATIONS

International Search Report issued in International Patent Application No. PCT/JP2023/006759, dated Mar. 20, 2023.

(Continued)

*Primary Examiner* — Nicholas L Foster
(74) *Attorney, Agent, or Firm* — GREENBLUM & BERNSTEIN, P.L.C.

(57) ABSTRACT

A sealing device and a sealing structure with which an improvement is achieved in terms of suppressing the infiltration of foreign matter such as muddy water. An elastic seal includes a main lip, a side lip, and an intermediate lip, and a second annular recess formed along an outer peripheral surface of the side lip is recessed in a central axis direction of an inner ring and toward a sealing target space side by a greater depth than a first annular recess formed between the side lip and the intermediate lip.

10 Claims, 4 Drawing Sheets

(56) References Cited

U.S. PATENT DOCUMENTS

| | | | |
|---|---|---|---|
| 12,196,317 B2* | 1/2025 | Ohmori | F16J 15/3232 |
| 2016/0003302 A1* | 1/2016 | Seno | F16J 15/3232 |
| | | | 277/351 |
| 2017/0198748 A1* | 7/2017 | Seo | F16C 33/7879 |
| 2017/0335890 A1* | 11/2017 | Harada | F16C 33/7863 |
| 2018/0156336 A1* | 6/2018 | Kato | F16C 33/805 |
| 2019/0107154 A1 | 4/2019 | Ishida et al. | |
| 2019/0107155 A1 | 4/2019 | Kato | |
| 2021/0355996 A1 | 11/2021 | Czech | |
| 2022/0205539 A1 | 6/2022 | Ariizumi | |

FOREIGN PATENT DOCUMENTS

| | | |
|---|---|---|
| JP | 2017-36740 | 2/2017 |
| JP | 2017-137973 | 8/2017 |
| JP | 2017-180735 | 10/2017 |
| JP | 2018-54095 | 4/2018 |
| JP | 2019-70398 | 5/2019 |
| JP | 2019-138399 | 8/2019 |
| JP | 2020-24034 | 2/2020 |
| JP | 2020-34053 | 3/2020 |
| JP | 2020-70897 | 5/2020 |
| JP | 2020-79615 | 5/2020 |
| JP | 2021-8948 | 1/2021 |
| JP | 2021-11938 | 2/2021 |
| WO | 2017/221582 | 12/2017 |
| WO | 2020/246206 | 12/2020 |

OTHER PUBLICATIONS

Japan, Notice of Reasons for Refusal received in JP Application No. 2024-504660, dated Dec. 10, 2024.

Extended European Search Report received in EP Application No. 23763362.3, dated Jun. 16, 2025.

* cited by examiner

SEALING DEVICE AND SEALING STRUCTURE

TECHNICAL FIELD

The present invention relates to a sealing device and a sealing structure.

BACKGROUND ART

In a hub bearing installed in an automobile or the like, a sealing device is provided to suppress the infiltration of foreign matter such as muddy water into the interior of the bearing, and to suppress leakage of a lubricant such as grease to the outside. The sealing device is provided so as to seal an annular gap between an inner ring and an outer ring. The inner ring typically has low rust resistance, and therefore, when muddy water or the like adheres thereto so that rust forms, the sealing performance decreases.

CITATION LIST

Patent Literature

[PTL 1]
Japanese Patent Application Publication No. 2012-61875
[PTL 2]
Japanese Patent Application Publication No. 2021-11938

SUMMARY OF INVENTION

Technical Problem

The present invention provides a sealing device and a sealing structure with which an improvement is achieved in terms of suppressing the infiltration of foreign matter such as muddy water.

Solution to Problem

To achieve the object described above, the present invention employs the following means.

A sealing device according to the present invention is a sealing device used in a hub bearing in order to seal an annular gap between an inner ring and an outer ring, the sealing device including:
  a slinger having a cylindrical portion that is mounted on the inner ring, and an outward flange that is provided on an end of the cylindrical portion; and
  a seal body that is mounted on the outer ring and includes a reinforcing ring and an elastic seal formed from an elastomer material and provided integrally with the reinforcing ring,
  wherein the elastic seal includes:
  a main lip;
  a side lip that extends radially outwardly and toward the opposite side to a sealing target space, and contacts the outward flange;
  an intermediate lip that is provided between the main lip and the side lip, extends radially outwardly and toward the opposite side to the sealing target space, and contacts the outward flange;
  a first annular recess formed between the side lip and the intermediate lip; and
  a second annular recess formed along an outer peripheral surface of the side lip, wherein the second annular recess is recessed in a central axis direction of the inner ring and toward the sealing target space side by a greater depth than the first annular recess.

According to the present invention, by increasing the depth of the second annular recess formed along the outer peripheral surface of the side lip, the capacity for holding foreign matter such as muddy water on the outer peripheral surface side of the side lip can be increased. This can suppress the infiltration of foreign matter such as muddy water toward the intermediate lip and the main lip.

The reinforcing ring may include a reinforcing ring cylindrical portion that is configured to be fitted to an inner peripheral surface of the outer ring, and a reinforcing ring outward flange that is provided on an end of the reinforcing ring cylindrical portion, and
  the bottom of the second annular recess may be positioned further toward the sealing target space side in the central axis direction of the inner ring than a surface of the reinforcing ring outward flange on the side to which the outer ring is fitted.

The slinger may include an outer ring portion that extends from a radially outward part of the outward flange in the central axis direction of the inner ring toward the sealing target space, and
  a labyrinth seal may be formed between the outer ring portion and an outer peripheral surface side of the seal body.

This can suppress the infiltration of foreign matter such as muddy water to the side lip side.

The main lip may contact an outer peripheral surface of the cylindrical portion of the slinger.

Thus, even when rust forms on the inner ring, the main lip is not affected by the rust formed on the inner ring.

The side lip and the intermediate lip may contact a planar end surface of the outward flange.

By configuring the intermediate lip and the side lip similarly in this manner so as to contact the planar end surface of the outward flange, the respective lips can demonstrate a sealing function with more stability than when configured to contact a curved surface. This can suppress the infiltration of foreign matter such as muddy water toward the main lip.

A sealing structure according to the present invention includes an inner ring, an outer ring provided concentrically with the inner ring, and the sealing device described above, for sealing the annular gap between the inner ring and the outer ring.

Further, a sealing structure according to the present invention includes:
  an inner ring having a columnar surface-shaped outer peripheral surface, a planar end surface, and a curved surface connecting the outer peripheral surface to the end surface;
  an outer ring provided concentrically with the inner ring; and
  a sealing device used in a hub bearing in order to seal an annular gap between the inner ring and the outer ring, the sealing device comprising:
  a slinger including a cylindrical portion that is mounted on the inner ring, and an outward flange that is provided on an end of the cylindrical portion; and
  a seal body that is mounted on the outer ring and includes a reinforcing ring and an elastic seal formed from an elastomer material and provided integrally with the reinforcing ring, wherein the elastic seal includes:

a main lip;

a side lip that extends radially outwardly and toward the opposite side to a sealing target space, and contacts the outward flange; and an intermediate lip that is provided between the main lip and the side lip, extends radially outwardly and toward the opposite side to the sealing target space, and contacts the outward flange, and the cylindrical portion is mounted along the outer peripheral surface of the inner ring, the outward flange is mounted so as to closely contact the end surface of the inner ring, and the slinger includes a curved portion that is provided so as to connect the cylindrical portion to the outward flange and closely contacts the curved surface of the inner ring.

According to the present invention, dead space formed between the slinger and the inner ring can be minimized. This can maximize a space formed between the slinger and the seal body, enabling an increase in the capacity for holding foreign matter such as muddy water. This can prevent foreign matter such as muddy water from reaching the main lip.

The sealing device may include a first annular recess formed between the side lip and the intermediate lip and a second annular recess formed along an outer peripheral surface of the side lip. The second annular recess may be recessed in a central axis direction of the inner ring and toward the sealing target space side by a greater depth than the first annular recess.

The reinforcing ring may include a reinforcing ring cylindrical portion that is fitted to an inner peripheral surface of the outer ring, and a reinforcing ring outward flange that is provided on an end of the reinforcing ring cylindrical portion, and the bottom of the second annular recess may be positioned further toward the sealing target space side in the central axis direction of the inner ring than a surface of the reinforcing ring outward flange on the side to which the outer ring is fitted.

The slinger may include an outer ring portion that extends from a radially outward part of the outward flange in the central axis direction of the inner ring toward the sealing target space, and a labyrinth seal may be formed between the outer ring portion and an outer peripheral surface side of the seal body.

The main lip may contact an outer peripheral surface of the cylindrical portion of the slinger.

Note that the configurations described above may be employed in any possible combinations.

Advantageous Effects of Invention

According to the present invention, as described above, an improvement can be achieved in terms of suppressing the infiltration of foreign matter such as muddy water.

DESCRIPTION OF EMBODIMENTS

Exemplary forms in which the invention is implemented will be described in detail below with reference to the figures on the basis of an embodiment. Note, however, that unless specifically indicated otherwise, the scope of the invention is not limited only to the dimensions, materials, shapes, relative arrangements, and so on of the constituent components described in the embodiment.

(Hub Bearing)

Figure 1:
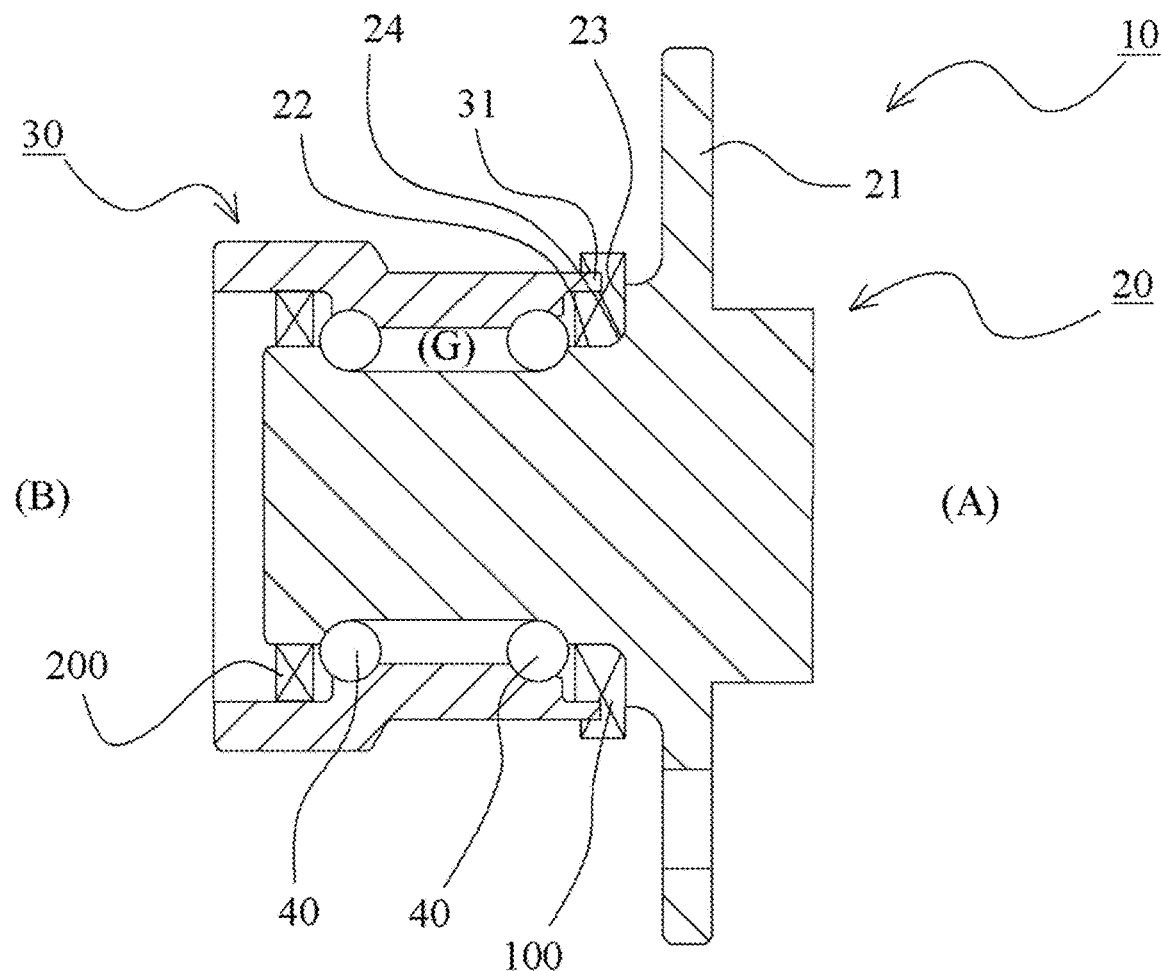
FIG. 1 is a schematic sectional view of a hub bearing according to an embodiment of the present invention.

A hub bearing to which a sealing device according to this embodiment can be applied will be described with reference to FIG. 1. FIG. 1 is a schematic sectional view of the hub bearing according to this embodiment of the present invention. FIG. 1 is a schematic sectional view obtained by cutting the hub bearing on a plane that includes a (rotary) central axis of an inner ring.

An automobile is equipped with a hub bearing 10. The hub bearing 10 includes an inner ring 20, an outer ring 30 provided concentrically with the inner ring 20, and a plurality of balls 40 provided therebetween. The inner ring 20 and the outer ring 30 are configured to be capable of relative rotation. A tire (not shown) is fixed to the inner ring 20 side, and the outer ring 30 is mounted on a vehicle body side. Hereinafter, for convenience, the right side of FIG. 1 will be referred to as the tire side (A), and the left side will be referred to as the vehicle body side (B). An outward flange 21 for mounting the tire is provided on the tire side (A) of the inner ring 20. Further, sealing devices 100, 200 for sealing an annular gap between the inner ring 20 and the outer ring 30 are provided in order to suppress the infiltration of foreign matter such as muddy water into the interior of the hub bearing 10 from the outside and to prevent grease (G) serving as a lubricant from leaking out of the interior. The sealing device 100 on the tire side (A) will also be referred to as an outer seal, and the sealing device 200 on the vehicle body side (B) will also be referred to as an inner seal.

Embodiment

Figure 2:
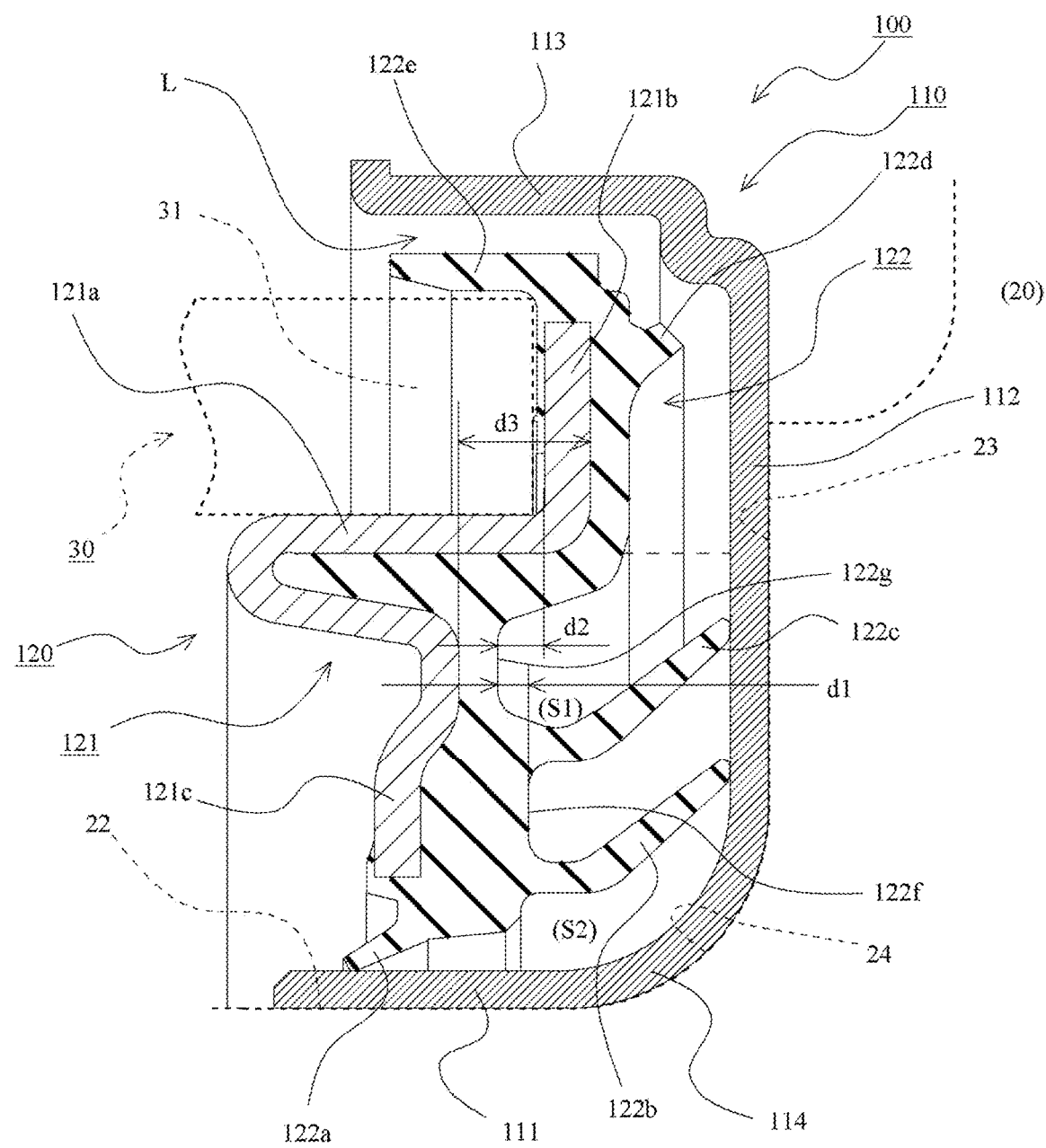
FIG. 2 is a schematic sectional view of a sealing device according to this embodiment of the present invention.
Figure 3:
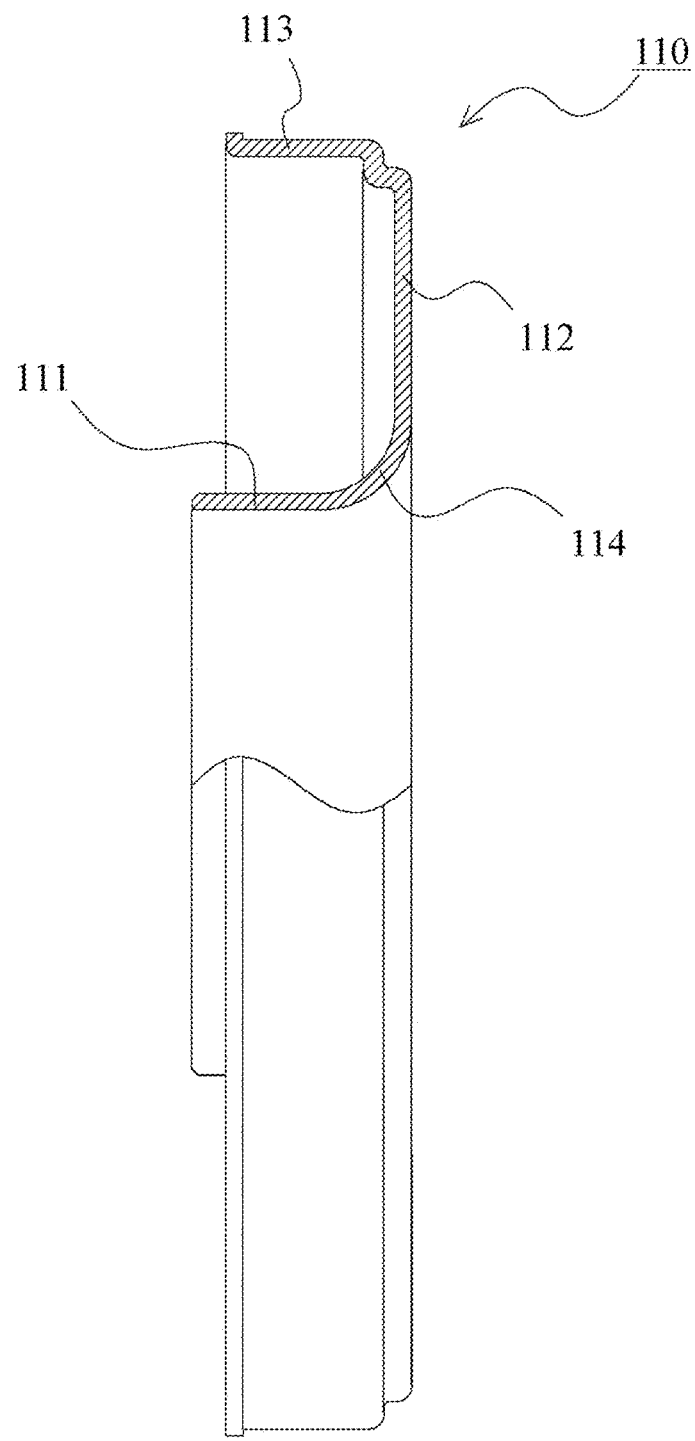
FIG. 3 is a schematic view showing a configuration of a slinger according to this embodiment of the present invention.
Figure 4:
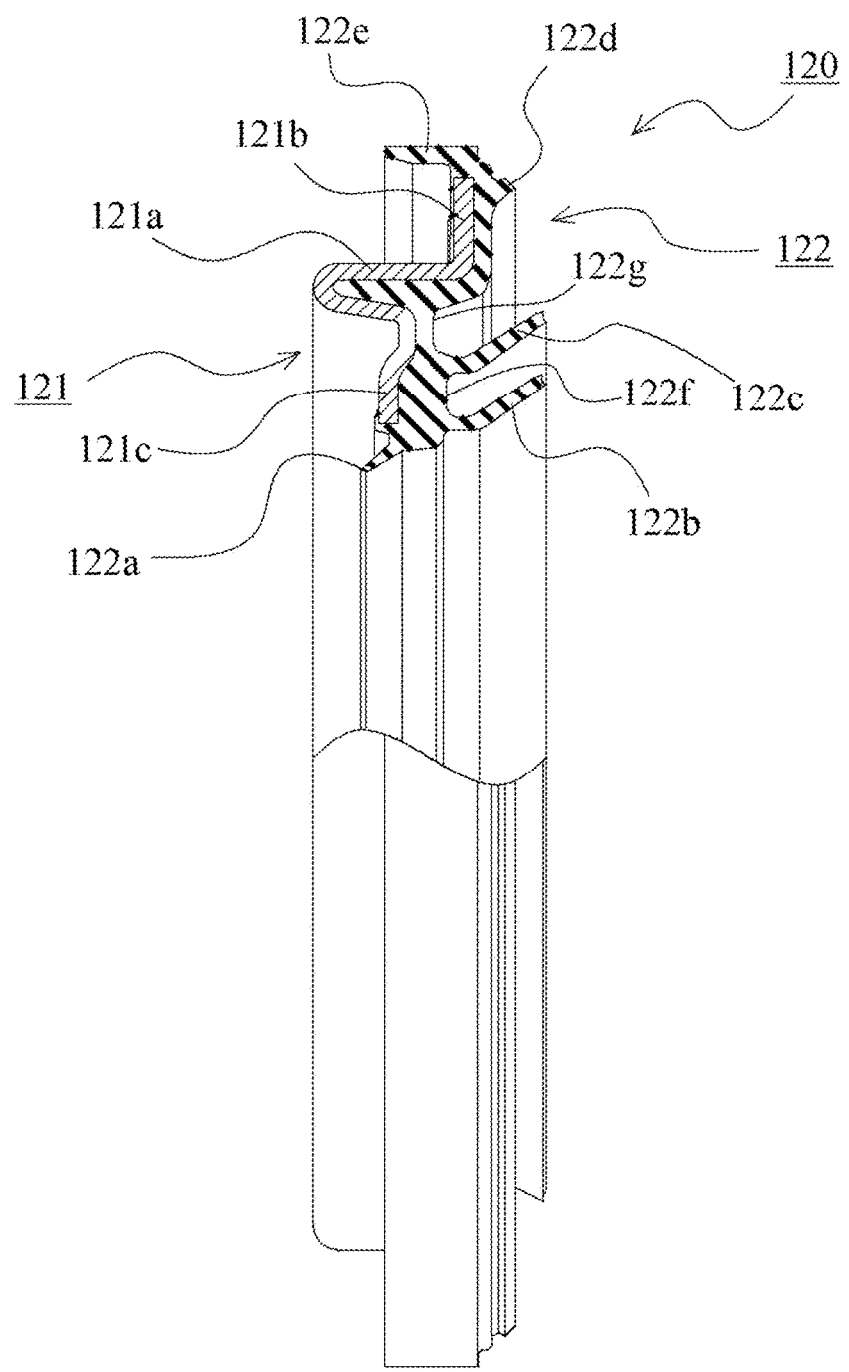
FIG. 4 is a schematic view showing a configuration of a seal body according to this embodiment of the present invention.

Referring to FIGS. 2 to 4, a sealing device and a sealing structure according to an embodiment of the present invention will be described. FIG. 2 is a schematic sectional view of the sealing device according to this embodiment of the present invention. In FIG. 2, a part of the inner ring 20 and a part of the outer ring 30 after installing the sealing device into the hub bearing are shown by dotted lines. Note that FIG. 2 is a sectional view obtained by cutting the sealing device on a plane that includes the central axis of the sealing device. FIG. 3 is a schematic view showing a configuration of a slinger according to this embodiment of the present invention, wherein a sectional view obtained by cutting a part of the slinger on a plane that includes the central axis of the slinger is shown in the upper portion of the drawing, and an external view is shown in the lower portion of the drawing. FIG. 4 is a schematic view showing a configuration of a seal body according to this embodiment of the present invention, wherein a sectional view obtained by cutting a part of the seal body on a plane that includes the central axis of the seal body is shown in the upper portion of the drawing, and an external view is shown in the lower portion of the drawing. The sealing device 100 according to this embodiment can be applied as the aforementioned outer seal. An embodiment of the sealing device 100 applied as the outer seal and a sealing structure that includes the sealing device 100 will be described below. Note that the sealing device of the present invention is not limited to being applied to a hub bearing for an automobile, and may be employed in various applications, such as an industrial hub bearing.

<Sealing Structure>

The sealing structure according to this embodiment includes the inner ring 20, the outer ring 30 provided concentrically with the inner ring 20, and the sealing device 100 for sealing the annular gap between the inner ring 20 and the outer ring 30. The inner ring 20 includes a columnar surface-shaped outer peripheral surface 22, a planar end surface 23, and a curved surface 24 connecting the outer peripheral surface 22 to the end surface 23. The sealing device 100 is disposed in an annular space part between an annular part 31 near the tip end of the outer ring 30 on the tire side (A) and the outer peripheral surface 22, side surface 23, and curved surface 24 of the inner ring 20.

<Sealing Device>

The sealing device 100 according to this embodiment includes a slinger 110 formed from a rigid material such as a metal, and a seal body 120.

The slinger 110 includes a cylindrical portion 111 that is mounted on the inner ring 20, an outward flange 112 that is provided on an end of the cylindrical portion 111, and an outer ring portion 113 that extends from a radially outward part of the outward flange 112 in the central axis direction of the inner ring 20 toward the side of a sealing target space. Note that in this embodiment, the sealing target space is a space between the outer seal (the sealing device 100) and the inner seal (the sealing device 200), in which the plurality of balls 40 are arranged and a lubricant (grease) is charged. The side of the sealing target space relative to the sealing device 100 can also be referred to as the vehicle body side (B). The slinger 110 also includes a curved portion 114 provided to connect the cylindrical portion 111 to the outward flange 112.

In this embodiment, the cylindrical portion 111 of the slinger 110 is mounted along the outer peripheral surface 22 of the inner ring 20. Further, the outward flange 112 of the slinger 110 is mounted so as to closely contact the end surface 23 of the inner ring 20. Furthermore, the curved portion 114 of the slinger 110 is configured to closely contact the curved surface 24 of the inner ring 20. This can minimize dead space formed between the slinger 110 and the inner ring 20.

The seal body 120 includes a reinforcing ring 121 formed from a rigid material such as a metal, and an elastic seal 122 formed from an elastomer material and provided integrally with the reinforcing ring 121, and the seal body 120 is mounted on the outer ring 30.

The reinforcing ring 121 is configured to be mounted on the outer ring 30. The reinforcing ring 121 includes a cylindrical portion (a reinforcing ring cylindrical portion) 121a that is fitted to an inner peripheral surface of the annular part 31 of the outer ring 30, an outward flange (a reinforcing ring outward flange) 121b that is provided on one end of the cylindrical portion 121a, and a trunk portion 121c that extends radially inwardly from the other end of the cylindrical portion 121a. By providing the elastic seal 122 by means of insert molding using the reinforcing ring 121 as an insert component, for example, the seal body 120 can be obtained such that the reinforcing ring 121 and the elastic seal 122 are formed integrally therein.

The elastic seal 122 includes a main lip 122a, an intermediate lip 122b, a side lip 122c, an auxiliary lip 122d, and an outer ring portion 122e, these components being formed integrally.

The main lip 122a is configured to extend radially inwardly toward the sealing target space side (the vehicle body side (B)). In this embodiment, the main lip 122a is configured to contact an outer peripheral surface of the cylindrical portion 111 of the slinger 110. The intermediate lip 122b is provided between the main lip 122a and the side lip 122c. The intermediate lip 122b is configured to extend radially outwardly toward the opposite side (the tire side (A)) to the sealing target space, and to contact a planar end surface of the outward flange 112 of the slinger 110. The side lip 122c is configured to extend radially outwardly toward the opposite side (the tire side (A)) to the sealing target space, and to contact the planar end surface of the outward flange 112 of the slinger 110. Note that when the inner ring 20 and the outer ring 30 rotate relative to each other, the slinger 110 fixed to the inner ring 20 and the seal body 120 fixed to the outer ring 30 rotate relative to each other. The main lip 122a, the intermediate lip 122b, and the side lip 122c slide relative to the slinger 110.

Further, the auxiliary lip 122d is configured to extend radially outwardly toward the opposite side (the tire side (A)) to the sealing target space, and not to contact the slinger 110. The outer ring portion 122e is configured such that a small annular gap is provided between the outer ring portion 122e and the outer ring portion 113 of the slinger 110. With this configuration, a labyrinth seal L is formed between the outer ring portion 113 of the slinger 110 and the outer peripheral surface side of the seal body 120. More specifically, the labyrinth seal L is constituted by the small annular gap between the outer ring portion 122e of the seal body 120 and the outer ring portion 113 of the slinger 110, and a small annular gap between the auxiliary lip 122d of the seal body 120 and the slinger 110.

In the seal body 120 configured as described above, a first annular recess 122f is formed between the side lip 122c and the intermediate lip 122b. Further, a second annular recess 122g is formed along the outer peripheral surface of the side lip 122c. In this embodiment, the second annular recess 122g is configured such that the depth thereof in the central axis direction of the inner ring 20 and toward the sealing target space side is greater than that of the first annular recess 122f. In other words, the second annular recess 122g is configured such that a distance from the end surface of the outward flange 112 of the slinger 110, on which the side lip 122c and the intermediate lip 122b contact each other, to the bottom of the recess is greater than in the first annular recess 122f. Accordingly, the depth of the recess of the second annular recess 122g is configured to be greater than the depth of the recess of the first annular recess 122f by d1 (see FIG. 2). Moreover, the bottom of the second annular recess 122g is configured to be positioned further toward the sealing target space side in the central axis direction of the inner ring 20 than the surface of the outward flange 121b of the reinforcing ring 121 on the side to which the outer ring 30 is fitted (see a distance d2 in FIG. 2). Furthermore, in this embodiment, an ample step d3 is provided between the outward flange 121b of the reinforcing ring 121 and the trunk portion 121c. By providing the step d3, the depth of the second annular recess 122g can be increased.

Advantages of Sealing Device and Sealing Structure According to this Embodiment

With the sealing device 100 and the sealing structure including the sealing device 100 according to this embodiment, an improvement can be achieved in terms of suppressing the infiltration of foreign matter such as muddy water. As a result, the sealing functions realized by the various seal lips (the main lip 122a in particular) can be demonstrated over the long term. Moreover, rusting of the inner ring 20 due to adherence of foreign matter such as muddy water can be suppressed. As a result, the durable life of the sealing device 100 can be extended. The reason why an improvement can be achieved in terms of suppressing the infiltration of foreign matter such as muddy water will be described in more detail below.

In the sealing device 100 used in the hub bearing, foreign matter such as muddy water adheres to the side lip 122c during use. The foreign matter flows down along the outer peripheral surface of the side lip 122c due to gravity, but a part thereof may remain on top of the side lip 122c. Over time, the foreign matter accumulates on top of the side lip 122c such that some of the foreign matter passes through the seal part formed by the side lip 122c and infiltrates toward the intermediate lip 122b. Thereafter, due to deterioration over time, some of the foreign matter also passes through the seal part formed by the intermediate lip 122b so as to infiltrate toward the main lip 122a. When the foreign matter infiltrates the seal part formed by the main lip 122a, the sealing performance decreases. Note that the side lip 122c and the intermediate lip 122b extend radially outwardly and therefore have a function for discharging the foreign matter to the outside of the lips after the foreign matter passes through the seal parts.

In the sealing device 100 according to this embodiment, by increasing the depth of the second annular recess 122g (the recess toward the sealing target space side in the central axis direction of the inner ring 20), the capacity for holding foreign matter such as muddy water on the outer peripheral surface side of the side lip 122c can be increased. As a result, the infiltration of foreign matter such as muddy water toward the intermediate lip 122b and the main lip 122a can be suppressed. Note that in this embodiment, a sectional area S1 of the second annular recess 122g is set to be at least 6 mm$^2$, in contrast to a conventional structure in which the sectional area S1 is approximately 5.6 mm$^2$. Note that "the sectional area S1 of the second annular recess 122g" is defined as the sectional area of a cross-section obtained by cutting a space surrounded by the outer peripheral surface of the side lip 122c, the end surface of the outward flange 112 of the slinger 110, and an extension surface (an imaginary surface (see the dotted line in FIG. 2)) of the inner peripheral surface of the cylindrical portion 121a of the reinforcing ring 121 on a plane that includes the central axis of the sealing device 100.

Further, in this embodiment, the intermediate lip 122b, similarly to the side lip 122c, is configured to contact the planar end surface of the outward flange 112. Hence, the intermediate lip 122b can likewise demonstrate a sealing function with more stability than when configured to contact a curved surface. As a result, even when foreign matter such as muddy water infiltrates from the seal portion of the side lip 122c, the foreign matter can be effectively prevented from infiltrating toward the main lip 122a by the intermediate lip 122b.

Moreover, this embodiment employs a configuration in which the labyrinth seal L is formed. As a result, the infiltration of foreign matter such as muddy water to the side lip 122c side can be suppressed.

Furthermore, in this embodiment, the main lip 122a is configured to contact the outer peripheral surface of the cylindrical portion 111 of the slinger 110. Hence, even if rust forms on the inner ring 20, the main lip 122a is not affected by the rust formed on the inner ring 20. The inner ring 20 is typically formed from a material having low rust resistance, whereas the material of the slinger 110 can be selected freely. Therefore, by using SUS, for example, which has high rust resistance, as the material of the slinger 110, the sealing function realized by the main lip 122a can be demonstrated with stability over the long term.

Moreover, in this embodiment, by employing a configuration in which the respective parts of the slinger 110 closely contact the respective parts of the inner ring 20, the dead space formed between the slinger 110 and the inner ring 20 can be minimized. Accordingly, the space formed between the slinger 110 and the seal body 120 can be maximized, enabling an increase in the capacity for holding foreign matter such as muddy water. As a result, foreign matter such as muddy water can be prevented from reaching the main lip 122a. Note that since the distance by which the slinger 110 and the inner ring 20 closely contact each other also increases, an effect is also obtained in that muddy water entering between the slinger 110 and the inner ring 20 is less likely to enter the sealing target space. When muddy water enters the small gap between the slinger 110 and the inner ring 20, rust forms on the surface of the inner ring 20 that contacts the slinger 110 on the atmosphere side. Rust in this location may gradually advance from the atmosphere side toward the sealing target space side over time, leading to an increase in the amount of infiltrating muddy water. When the distance by which the slinger 110 and the inner ring 20 closely contact each other is long, it takes more time for the rust to advance from the atmosphere side to the sealing target space side, and therefore muddy water infiltration along this route can also be delayed.

In this embodiment, a sectional area S2 of a cross-section obtained by cutting the space surrounded by the main lip 122a and intermediate lip 122b and the slinger 110 on a plane that includes the central axis of the sealing device 100 can be set at 3 mm$^2$ or more, in contrast to a conventional structure in which the sectional area S2 is approximately 1 to 1.5 mm$^2$.

In the sealing device 100 and the sealing structure according to this embodiment, as described above, a plurality of means are employed in order to suppress the infiltration of foreign matter such as muddy water into the seal part formed by the main lip 122a. As a result, the infiltration of foreign matter such as muddy water can be suppressed synergistically.

(Miscellaneous)

In the embodiment described above, a plurality of means are employed in order to suppress the infiltration of foreign matter such as muddy water into the seal part formed by the main lip 122a. Depending on the use environment, however, not all of the means necessarily have to be employed.

For example, when there is plenty of room to arrange the sealing device 100, a configuration in which a gap is provided between the slinger 110 and the end surface 23 and curved surface 24 of the inner ring 20 can be employed. Moreover, a configuration in which the labyrinth seal L is not provided can be employed. In other words, a configuration in which the outer ring portion 113 is not provided on the slinger 110 and a configuration in which the outer ring portion 122e is not provided on the seal body 120 can be employed. Furthermore, a configuration in which the main lip 122a directly contacts the outer peripheral surface of the inner ring 20 can be employed.

REFERENCE SIGNS LIST

10 Hub bearing
20 Inner ring

21 Outward flange
22 Outer peripheral surface
23 End surface
24 Curved surface
30 Outer ring
31 Annular part
40 Ball
100, 200 Sealing device
110 Slinger
111 Cylindrical portion
112 Outward flange
113 Outer ring portion
114 Curved portion
120 Seal body
121 Reinforcing ring
121a Cylindrical portion
121b Outward flange
121c Trunk portion
122 Elastic seal
122a Main lip
122b Intermediate lip
122c Side lip
122d Auxiliary lip
122e Outer ring portion
122f First annular recess
122g Second annular recess
L Labyrinth seal

The invention claimed is:

1. A sealing device for sealing an annular gap between an inner ring and an outer ring of a hub bearing, the sealing device comprising:
a slinger having a cylindrical portion configured to be mounted on the inner ring, and an outward flange that is provided on an end of the cylindrical portion; and
a seal body configured to be mounted on the outer ring and includes a reinforcing ring and an elastic seal formed from an elastomer material and provided integrally with the reinforcing ring,
wherein the elastic seal includes:
a main lip;
a side lip that extends radially outwardly and toward an opposite side to a sealing target space, and contacts the outward flange;
an intermediate lip that is provided between the main lip and the side lip, extends radially outwardly and toward the opposite side to the sealing target space, and contacts the outward flange,
a first annular recess formed between the side lip and the intermediate lip; and
a second annular recess formed along an outer peripheral surface of the side lip, wherein
the second annular recess is recessed in a central axis direction of the inner ring and toward the sealing target space side by a greater depth than the first annular recess; and
wherein a bottom of the second annular recess is positioned farther toward the sealing target space side in the central axis direction of the inner ring than a surface of the reinforcing ring outward flange on the side to which the outer ring is fitted,
wherein the reinforcing ring includes a trunk portion having a convex shape oppositely facing and protruding towards the bottom of the second annular recess, and
wherein the convex shape spans an entire length of the bottom of the second annular recess in a direction perpendicular to the central axis direction of the inner ring.

2. The sealing device according to claim 1, wherein the reinforcing ring includes a reinforcing ring cylindrical portion that is configured to be fitted to an inner peripheral surface of the outer ring, and a reinforcing ring outward flange that is provided on an end of the reinforcing ring cylindrical portion.

3. The sealing device according to claim 1, wherein the slinger includes an outer ring portion that extends from a radially outward part of the outward flange in the central axis direction of the inner ring toward the sealing target space, and
a labyrinth seal is formed between the outer ring portion and an outer peripheral surface side of the seal body.

4. The sealing device according to claim 1, wherein the main lip contacts an outer peripheral surface of the cylindrical portion of the slinger.

5. The sealing device according to claim 1, wherein the side lip and the intermediate lip contact a planar end surface of the outward flange.

6. A sealing structure comprising:
an inner ring;
an outer ring provided concentrically with the inner ring; and
the sealing device according to claim 1, which seals the annular gap between the inner ring and the outer ring.

7. A sealing structure comprising:
an inner ring having a columnar surface-shaped outer peripheral surface, a planar end surface, and a curved surface connecting the outer peripheral surface to the end surface;
an outer ring provided concentrically with the inner ring; and
a sealing device that seals an annular gap between the inner ring and the outer ring,
the sealing device comprising:
a slinger including a cylindrical portion that is mounted on the inner ring, and an outward flange that is provided on an end of the cylindrical portion; and
a seal body that is mounted on the outer ring and includes a reinforcing ring and an elastic seal formed from an elastomer material and provided integrally with the reinforcing ring,
wherein the elastic seal includes:
a main lip;
a side lip that extends radially outwardly and toward an opposite side to a sealing target space, and contacts the outward flange; and
an intermediate lip that is provided between the main lip and the side lip, extends radially outwardly and toward the opposite side to the sealing target space, and contacts the outward flange,
the cylindrical portion is mounted along the outer peripheral surface of the inner ring, the outward flange is mounted so as to closely contact the end surface of the inner ring, and the slinger includes a curved portion that is provided so as to connect the cylindrical portion to the outward flange and closely contacts the curved surface of the inner ring,
wherein the sealing device includes a first annular recess formed between the side lip and the intermediate lip and a second annular recess formed along an outer peripheral surface of the side lip, and the second annular recess is recessed in a central axis direction of the inner ring and toward the sealing target space side by a greater depth than the first annular recess, wherein a bottom of the second annular recess is positioned farther toward the sealing target space side in the central axis direction of the inner ring than a surface of the reinforcing ring outward flange on the side to which the outer ring is fitted, wherein the reinforcing ring includes a trunk portion having a convex shape oppositely facing and protruding towards the bottom of the second annular recess, and wherein the convex shape spans an entire length of the bottom of the second annular recess in a direction perpendicular to the central axis direction of the inner ring.

8. The sealing structure according to claim 7, wherein the reinforcing ring includes a reinforcing ring cylindrical portion that is fitted to an inner peripheral surface of the outer ring, and a reinforcing ring outward flange that is provided on an end of the reinforcing ring cylindrical portion.

9. The sealing structure according to claim 7, wherein the slinger includes an outer ring portion that extends from a radially outward part of the outward flange in the central axis direction of the inner ring toward the sealing target space, and a labyrinth seal is formed between the outer ring portion and an outer peripheral surface side of the seal body.

10. The sealing structure according to claim 7, wherein the main lip contacts an outer peripheral surface of the cylindrical portion of the slinger.

* * * * *